United States Patent
Beaudouin et al.

(10) Patent No.: US 10,233,101 B2
(45) Date of Patent: Mar. 19, 2019

(54) EQUIPMENT FOR INJECTING A GAS INTO A CESSPOOL

(71) Applicants: L'Air Liquide, Société Anonyme pour l'Etude et l'Exploitation des Procédés Georges Claude, Paris (FR); Milton Roy Mixing, Avon (FR)

(72) Inventors: Guillaume Beaudouin, Trappes (FR); Robert Briend, Les Clayes-sous-Bois (FR); Ulrich Butz, Erkelenz (DE); Philippe Campo, Montigny le Bretonneux (FR); Frédéric Savreux, Saint-Mammès (FR); David Maret, Avon (FR); Patrice Cognart, Avon (FR)

(73) Assignees: L'Air Liquide, Société Anonyme pour l'Etude et l'Exploration des Procédés Georges Claude, Paris (FR); Milton Roy Mixing, Avon (FR)

( * ) Notice: Subject to any disclaimer, the term of this patent is extended or adjusted under 35 U.S.C. 154(b) by 0 days.

(21) Appl. No.: 15/649,300

(22) Filed: Jul. 13, 2017

(65) Prior Publication Data
US 2017/0305771 A1 Oct. 26, 2017

Related U.S. Application Data

(63) Continuation of application No. 14/119,958, filed as application No. PCT/FR2012/051114 on May 16, 2012, now Pat. No. 9,731,988.

(30) Foreign Application Priority Data

May 25, 2011 (FR) ...................... 11 54543

(51) Int. Cl.
*B01F 3/04* (2006.01)
*C02F 3/16* (2006.01)
*B01F 13/00* (2006.01)

(52) U.S. Cl.
CPC ............ *C02F 3/16* (2013.01); *B01F 3/04531* (2013.01); *B01F 13/0049* (2013.01); *B01F 2003/04574* (2013.01); *Y02W 10/15* (2015.05)

(58) Field of Classification Search
CPC .............. B01F 3/04531; B01F 13/0049; B01F 2003/04574; C02F 3/16; Y02W 10/15
(Continued)

(56) References Cited

U.S. PATENT DOCUMENTS

| 2,433,592 A | 12/1947 | Booth |
| 2,928,661 A | 3/1960 | MacLaren |

(Continued)

FOREIGN PATENT DOCUMENTS

| CN | 2356029 Y | 12/1999 |
| CN | 2469216 Y | 1/2002 |

(Continued)

OTHER PUBLICATIONS

French Search Report for corresponding FR 1154543, dated Jan. 18, 2012.

(Continued)

*Primary Examiner* — Charles S Bushey
(74) *Attorney, Agent, or Firm* — Allen E. White

(57) ABSTRACT

A floating equipment, for injection of a gas into liquid effluents or waste water, and more particularly of a gas rich in oxygen into a basin from the surface, including the following elements:
  a driving device, intended to be disposed over the liquid, provided with a vertical output shaft (8), equipped at its end with a propeller (6) immersed in the liquid (Continued)

a pre-mixing device (5) comprising an injection device (7) positioned above or below a mobile aerator (9) with inclined blades, the propeller being situated at the end of the shaft, under the pre-mixing reactor.

16 Claims, 2 Drawing Sheets

(58) Field of Classification Search
USPC .................................................. 261/91, 93
See application file for complete search history.

(56) References Cited

U.S. PATENT DOCUMENTS

| | | |
|---|---|---|
| 3,400,918 A | 9/1968 | MacLaren |
| 3,775,307 A | 11/1973 | McWhirter et al. |
| 3,776,531 A | 12/1973 | Ebner et al. |
| 4,699,740 A | 10/1987 | Bollenrath |
| 4,919,849 A | 4/1990 | Litz |
| 5,198,156 A | 3/1993 | Middleton et al. |
| 5,241,992 A * | 9/1993 | Oehlbeck ............ B01F 3/04262 137/897 |
| 6,109,449 A | 8/2000 | Howk |
| 6,145,815 A | 11/2000 | Cheng et al. |
| 6,158,722 A | 12/2000 | Gigas |
| 6,250,797 B1 | 6/2001 | Weetman |
| 6,270,061 B1 | 8/2001 | Bouquet et al. |
| 6,655,663 B2 | 12/2003 | Vento |
| 7,661,658 B2 | 2/2010 | Sun et al. |
| 8,172,206 B2 * | 5/2012 | St. Lawrence ...... B01F 3/04609 210/219 |
| 8,308,143 B2 | 11/2012 | Chevalier |
| 9,636,644 B2 * | 5/2017 | Pradel ................ B01F 3/04262 |
| 9,731,988 B2 * | 8/2017 | Beaudouin ................ C02F 3/16 |
| 2001/0049997 A1 | 12/2001 | Ahn |

FOREIGN PATENT DOCUMENTS

| | | |
|---|---|---|
| DE | 90 15 105 | 2/1991 |
| EP | 0 995 485 | 4/2000 |
| FR | 2 784 311 | 4/2000 |
| JP | S59 16597 | 1/1984 |
| JP | H06 91146 | 4/1994 |
| JP | 2000 167367 | 6/2000 |

OTHER PUBLICATIONS

International Search Report and Written Opinion for corresponding PCT/FR2012/051114, dated Jul. 30, 2012.

\* cited by examiner

EQUIPMENT FOR INJECTING A GAS INTO A CESSPOOL

CROSS REFERENCE TO RELATED APPLICATIONS

This continuation application claims the benefit of priority under 35 U.S.C. § 120 to U.S. patent application Ser. No. 14/119,958 now U.S. Pat. No. 9,731,988, filed Nov. 25, 2013, which is a 371 of International PCT Application PCT/FR2012/051114 filed Nov. 25, 2013 which claims priority to French Patent Application No. 1154543 filed May 25, 2011, the entire contents of which are incorporated herein by reference.

BACKGROUND

The present invention concerns the field of equipment enabling the injection of a gas into liquid effluents or waste water. It is notably relevant to methods of aerating biological basins in which sludge is activated by injection of a gas rich in oxygen or mixtures including $CO_2$.

SUMMARY

One of the objectives of the present invention is to propose novel floating equipment enabling optimization of the energy consumption of the device at the same time as eliminating the constraints of present-day equipment.

It will be remembered that aerobic biological treatment of effluents generally consists of bringing those effluents into contact with a biomass (microorganisms) that degrades the pollution contained therein by transforming the organic molecules. Thus it is known to inject a gas, generally an oxygenated gas, into the effluents contained in a basin, in such a manner as to feed the biomass. To this end, numerous devices for injecting gas into the effluents are offered on this market. Most of the systems are either immersed or floating.

They generally also agitate the effluents, the injection of the oxygenated gas combined with the agitation enabling better dissolution of the oxygenated gas in the effluent. This dissolution is measured by the transfer capacity of the device. For most of these devices for agitation of the liquid and injection of gas into the liquid, part of the transfer of the gas into the liquid is effected by gas/liquid mixing means, such as a venturi or a turbine, forming an emulsion of the gas in the liquid, and the rest of the transfer is obtained at the time of dispersion of the emulsion in the liquid.

It has been observed that most of these agitation and injection devices have had a limited injection capacity: beyond a certain gas injection flow rate, the device gets blocked because, at the level of the means of injection of the gas into the liquid, the volume of gas becomes too large relative to the volume of liquid. While it would be possible to transfer and dissolve more gas in the liquid contained in the treatment basin, the device cannot provide the whole quantity of gas necessary.

Floating systems enabling aeration by injection of a gas rich in oxygen use relatively complex technologies leading to costly constraints on manufacture and use and consequently limiting their use.

There may be cited by way of illustrative example the document EP-995 485 A1, which describes floating equipment that enables transfer of a gas rich in oxygen into a basin with a very high transfer efficiency. However, it uses for this purpose a complex technology calling on a turbine enabling a gas/liquid emulsion to be created, complemented by systems enabling this emulsion to be directed toward a propeller designed to disperse this emulsion in the basin.

The combination of such elements, turbine, systems enabling direction of the gas/liquid emulsion and dispersion propeller, has the following main consequences:
High energy consumption, the turbine consuming approximately 40% of the total energy consumed by the equipment;
High equipment weight, implying a high material cost and constraints on the choice of floats;
Manufacture and assembly constraints having the consequence of high equipment manufacture and maintenance costs;
A limit on the flow rate of gas that may be injected by the equipment (see above), caused in particular by the use of a turbine and systems enabling direction of the gas/liquid emulsion generated by the turbine.

Thus one of the objectives of the present invention is to propose floating equipment enabling the injection of a gas rich in oxygen and having a gas transfer efficiency equivalent to the prior art devices whilst limiting or eliminating the technical drawbacks of those prior art devices.

To achieve this objective, it is proposed here to eliminate the turbine, with the aim of achieving the following objectives:
a reduction of approximately 30% in the energy consumed;
the elimination of the main elements for guiding the flows generated by the turbine;
an increase in the blocking limit of the equipment of more than 50%;
a reduction of approximately 25% in the weight of the equipment;
major simplification of its manufacture, assembly and maintenance;
a reduction in manufacturing and maintenance costs;
an increase in the field of action of the equipment for equivalent consumed power.

Eliminating the turbine could nevertheless appear negative to the person skilled in the art since it has the consequence of eliminating wanted functions such as the generation of fine bubbles (typically in the range 0.8 to 2.5 mm in size) or the transfer rate of part of the gas.

As explained in more detail hereinafter, the proposed novel equipment of the present invention has been designed to replace or compensate these basic functions and to this end combines the following elements:
a driving device, intended to be disposed over the liquid, provided with a vertical output shaft, equipped at its end with a propeller immersed in the liquid, the propeller preferably being characterized by a high coverage rate (see below);
a device that might be called a reactor of the pre-mixing type comprising an injection device (for example an injection torus), positioned above or below a mobile aerator with inclined blades;
the propeller is situated at the end of the shaft, below the pre-mixing reactor.

The expression "coverage rate" as applied to the propeller means the ratio of the area covered by the blades and the area of the circle within which the propeller is inscribed.

As stated above, the equipment includes an injection device, which is preferably a torus provided with a number of orifices designed for regular diffusion of the gas positioned in a circle inscribed in the diameter of the propeller. Studies carried out by the Applicant have demonstrated the advantageous performance of the injection torus in achieving homogeneous diffusion of the gas, but also in reducing possible phenomena of clogging, favouring easy installation and reduced maintenance. The orifices of the torus are preferably directed downward to prevent possible clogging.

Although the torus is preferred in accordance with the invention, it is equally possible to envisage, without departing from the scope of the invention, using other injection devices such as porous elements of different shapes (plates, candle filters or micro-perforated plates, etc.).

The basic functions of the reactor are obtained by combining a diffuser and a mobile aerator within inclined blades, judiciously positioned relative to the other elements of the equipment and notably the dispersion propeller. The hydraulic flow generated by this combination and this positioning lead to an optimized flow in the reactor. The "diffuser and mobile aerator with inclined blades" pair provides the pre-mixing reactor function indispensable to achieving the required performance, the choice, the combination and the positioning of the various elements constituting the overall equipment ensuring on the one hand the production of the pre-mix and on the other hand its dispersion in the basin, enabling optimum transfer into the basin to be obtained.

The arrangement proposed by the invention enables the pre-mix coming from the pre-mixer to be diffused in an area in which the liquid speed field is the optimum from the point of view of its intensity and its direction, in order to propel the bubbles as far as possible and to prevent the phenomenon of coalescence.

The person skilled in the art might be equally surprised by the presence in the equipment of the present invention of a mobile aerator with inclined blades.

A mobile aerator with inclined blades is not generally used in the dispersion of gas in liquids.

Nevertheless, in the case of the invention, this use is possible and favourable because of the use of a propeller with a high coverage rate and because of the positioning of said mobile aerator within the various components.

Thus it has been possible to demonstrate that the mobile aerator with inclined blades generates:
- An axial and radial flow favouring the homogeneity of the reactional mixture;
- Small gas bubbles (because of a high shear coefficient of the mobile aerator);
- Low disturbance of the hydraulic flow of the equipment, produced mainly by the propeller.

The mobile aerator with inclined blades is also characterized by a reduced energy consumption compared to the mobile aerators conventionally used for this function.

To summarize, there are found in this technical field only mobile aerators with straight blades, producing only a purely radial flow, thus creating a higher resistance, and thereby a higher energy consumption.

Thus the present invention concerns floating equipment, for injection of a gas into liquid effluents or waste water, and more particularly of a gas rich in oxygen into a basin from the surface, comprising the following elements:
- a driving device, intended to be disposed over the liquid, provided with a vertical output shaft, equipped at its end with a propeller immersed in the liquid;
- a pre-mixing device comprising an injection device (for example an injection torus), positioned above or below a mobile aerator with inclined blades, the propeller being situated at the end of the shaft, under the pre-mixing reactor.

The invention may furthermore adopt one or more of the following features:
- the propeller has a pumping flow rate number $N_{Qp}$ that is in the range 0.3 to 1, where: $Q_p = N_{Qp} \times N \times D^3$; where $Q_p$ is the pumping flow rate of the propeller, N the rotation speed of the propeller, and D the diameter of the propeller;
- the injection device is a torus, provided with injection orifices, and positioned in a circle inscribed in the diameter of the propeller, the torus being positioned at a distance in the range 0.01 to 1.5 times the diameter of the propeller above the propeller, preferably at a distance in the range 0.03 to 0.3 times the diameter of the propeller, above the propeller;
- the injection device is a torus, provided with injection orifices, the torus having a diameter of between 20 to 200% of the diameter of the propeller, advantageously 30 to 120% of the diameter of the propeller;
- the injection device is a torus, provided with injection orifices, the internal space of the torus being compartmentalized into at least two separate zones able to be supplied with different gases.

By way of example it is possible to supply one of the zones of the torus with oxygen and the other one or one of the other zones with a mixture of $O_2/O_3$. The possibility of having different gases (O2/O2+O3, O2/air, O2 or air/CO2 etc.) or supplying by means of a gas of different quality is particularly advantageous for some applications. Thus by way of example it is possible to consider the injection of air and oxygen in a simultaneous or alternative manner by eliminating any safety risk by using completely separate networks (no risk of contaminating the oxygen line with poor quality air, no risk of oxygen returning towards to the air compressors etc.).

It is also possible to consider using the same equipment for the injection of $CO_2$ in the context of regulating the pH and at the same time or in an alternative manner to inject a gas comprising oxygen for performing aeration.

In the context of gases with different flow rates/pressures problems associated with controlling the pressure and the flow rate relative to one another are eliminated:
- in one variant the injection device is formed by two half-toruses, each half-torus being able to be supplied with different gases as already described above,
- the injection device is formed by an assembly of porous elements of the porous candle filter type or porous plate type or perforated plate type, preferably 3 in number and situated in a volume defined by a vertical cylinder centered on the vertical axis of the propeller having an outside diameter preferably equal to at least 3 times the diameter of the propeller and a height preferably equal to at least three times the diameter of the propeller;
- the distance between the lower face of the float and the upper leading edge of the propeller is in the range 0.5 to 1.5 times the diameter of the propeller, preferably in the range 0.8 to 1.0 times the diameter of the propeller;
- the distance between the injection torus and the mobile aerator with inclined blades is in the range 1 to 20% of the diameter of the mobile aerator, preferably close to 2.5% of the diameter of the mobile aerator;
- the mobile aerator with inclined blades includes 2 to 12 blades, preferably 4 to 8 blades, and preferably an even number of times the number of blades of the propeller situated at the end of the shaft;
- the mobile aerator with inclined blades is positioned below the injector at a distance in the range of 5 mm to 100 mm;
- the injected gas is a gas with an oxygen content in the range 25 to 100%, or an ozone-containing gas, or a carbon dioxide-containing gas the $CO_2$ content of which is in the range 5 to 100%, or a gas comprising 80 to 100% nitrogen.

BRIEF DESCRIPTION OF THE DRAWINGS

Other features and advantages of the invention will emerge from the following description of embodiments given by way of non-limiting examples and with reference to the appended drawings, in which.

DESCRIPTION OF PREFERRED EMBODIMENTS

Figure 1:
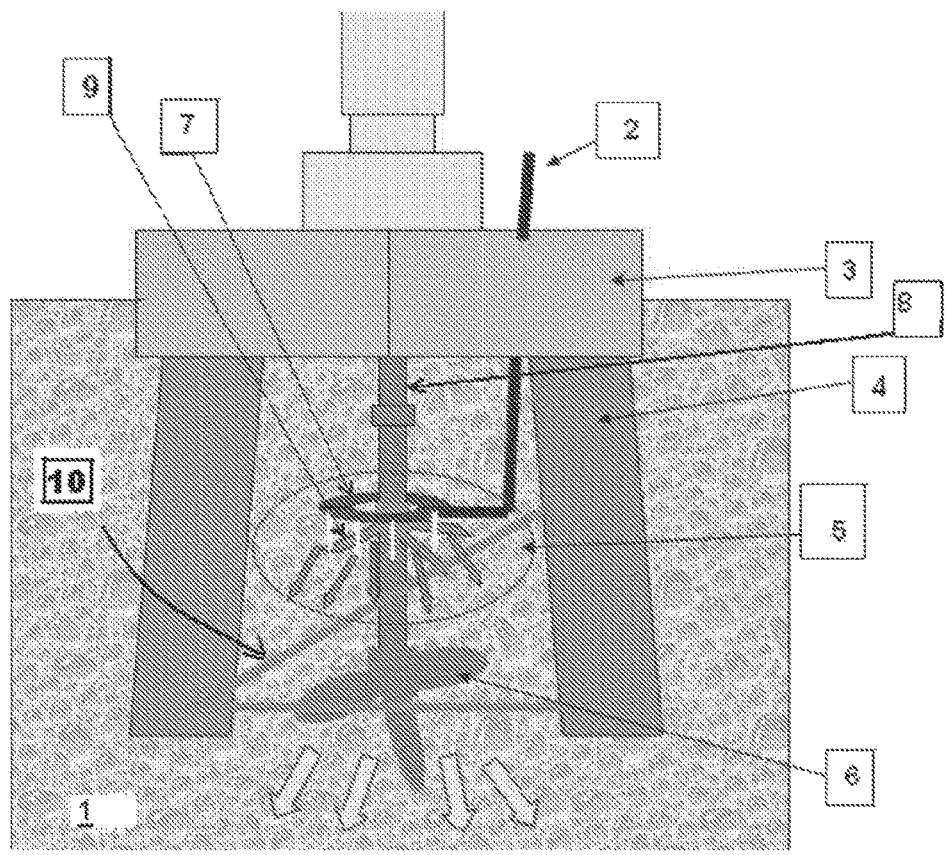
FIG. 1 is a partial diagrammatic sectional view showing one embodiment of the equipment of the invention using torus-type injection means.

FIG. 1 shows, in floating equipment, for the injection of a gas into a basin 1 of liquid effluents or waste water according to the invention:
- a driving device, intended to be disposed over the liquid 1, provided with a vertical output shaft 8, equipped at its end with a propeller 6 immersed in the liquid;
- the apparatus floats thanks to the presence of one or more floats 3;
- a pre-mixing device 5 comprising a torus-shaped injection device 7 (supplied by the gas inlet 2), positioned above a mobile aerator 9 with inclined blades, the propeller being situated at the end of the shaft, under the pre-mixing reactor. The embodiment shown here illustrates the case of a torus 7, the internal space of which is continuous, non-compartmentalised and supplied with gas via the single inlet 2, but a person skilled in the art would understand that, in the case of a compartmentalized torus with an internal space compartmentalized into at least two separate zones and able to be supplied with different gases, two or more gas inlets 2 would be provided on the torus;
- in the embodiment represented, the number of blades of the propeller is 3, and the number of blades of the mobile aerator is 6;
- a system 4 of counter-blades, here for the embodiment shown the device comprises 3 counter blades), enabling on the one hand the delimitation of the pre-mixing area but also preventing the formation of vortices and driving the equipment in rotation (the equipment would then turn like a spinning top). This system of counter-blades moreover enables orientation of the axial flow.

FIG. 1 is only a partial diagrammatic representation of the equipment which does not show all of the secondary or optional details in order to show the essential elements which belong to the invention more clearly, and thus in particular the metal body of the assembly has not been shown which are traditionally joined to the constituent elements of such injection equipment, and for example here the floats, the torus or even the counter blades. Thus FIG. 1 shows two reinforcing bars 10 connecting the two counter blades 4, said bars forming part of such a body.

Figure 3:
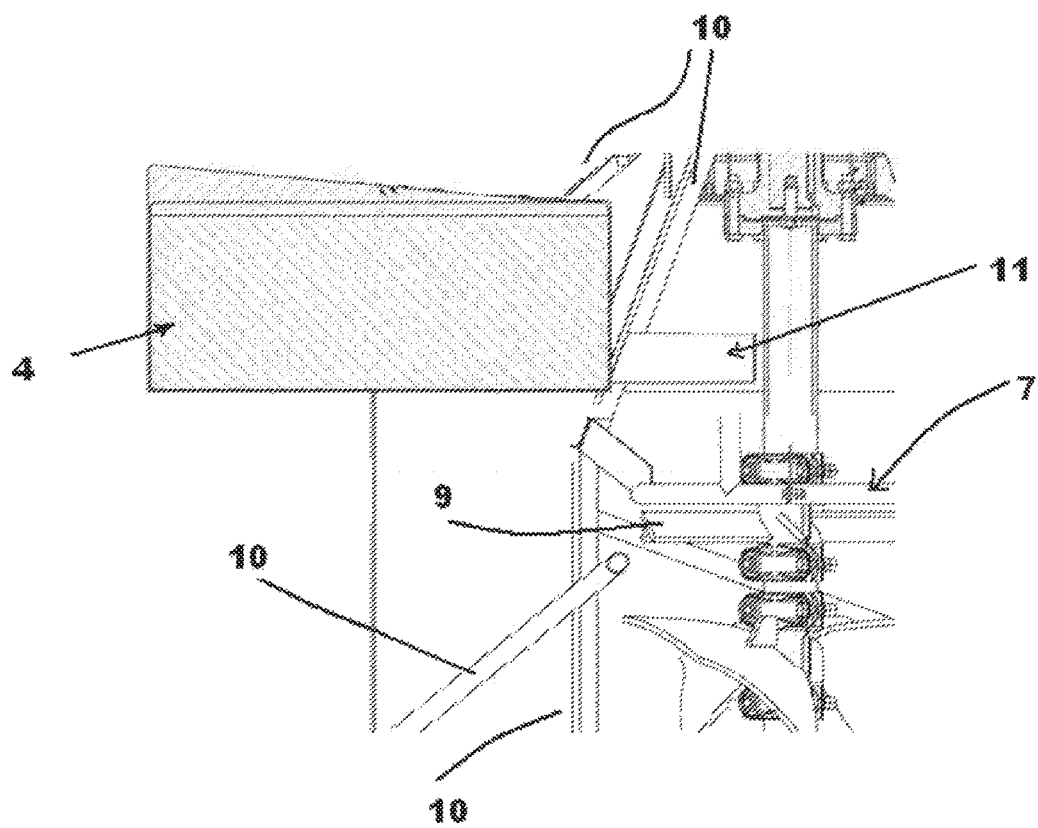
FIG. 3 is a detailed view of one of the embodiments of the invention comprising anti-vibration plates.

FIG. 3 illustrates in a detailed view one of the advantageous modes of implementing the invention which can be found in very interesting configurations, and in particular can limit the vibrations of the device. In this advantageous mode, the device comprises plates 11 with a parallelepiped or trapezoidal form, here three in number (one plate per counter blade), said plates fixed at one end to the body 10, for example on one of the counter blades 4 (they even form part of such a body), plates directed towards the drive axis of the propeller, and on the other hand located below the waterline.

Without being restricted in any way by the following technical explanations the Applicants have suggested that such a configuration partially channels the flow of liquid suctioned by the propeller and can contribute to a reduction in the potential vibration of the system.

Figure 2:
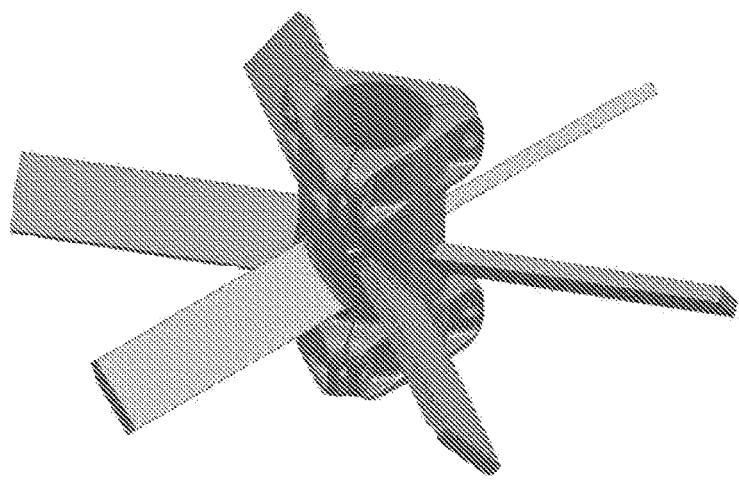
FIG. 2 shows an embodiment of a mobile aerator with inclined blades of the invention including 6 blades.

Equipment like that described in the context of FIGS. 1 and 2 has been used for the injection of oxygen into a biological oxidation basin treating effluents from a paperwork.

For an oxygen demand evaluated at 53.3 kg/h, a flow rate of oxygen of 45 $m^3/h$ was injected into the basin. The calculated transfer efficiency was evaluated at a value close to 91.3%, which represents excellent performance.

Thus it has been demonstrated that simplification of the equipment has not degraded the performance obtained, to the contrary.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A floating equipment, for injection of a gas into liquid effluents or waste water, comprising the following elements:
   a driving device, intended to be disposed over the liquid, provided with a vertical output shaft (8), equipped at its end with a propeller (6) immersed in the liquid; and
   a pre-mixing device (5) comprising an injection device (7) positioned above or below a mobile aerator (9) with inclined blades, the propeller being situated at the end of the shaft, under a pre-mixing reactor,
   wherein the injection device is of torus shape and is formed by an assembly of porous elements.

2. The equipment of claim 1, wherein the assembly of porous elements is of porous candle filter type or porous plate type or perforated plate type.

3. The equipment of claim 2, wherein the porous elements are situated in a volume defined by a vertical cylinder centered on the vertical axis of the propeller, the vertical cylinder having an outside diameter equal to at least 3 times the diameter of the propeller and a height equal to at least three times the diameter of the propeller.

4. The equipment of claim 1, wherein the propeller has a pumping flow rate number NQp that is in the range 0.3 to 1, where:
   $Qp=NQp \times N \times D3$; where Qp is the pumping rate of the propeller, N the rotation speed of the propeller, and D the diameter of the propeller.

5. The equipment of claim 1, wherein the injection device is a torus, and positioned in a circle inscribed in the diameter of the propeller, the torus being positioned at a distance between 0.01 to 1.5 times the diameter of the propeller above the propeller.

6. The equipment of claim 1, wherein the injection device is a torus, and positioned in a circle inscribed in the diameter of the propeller, the torus being positioned at a distance between 0.03 to 0.3 times the diameter of the propeller, above the propeller.

7. The equipment of claim 5, wherein the distance between the injection torus and the mobile aerator with inclined blades is between 1 to 20% of the diameter of the mobile aerator.

8. The equipment of claim 5, wherein the distance between the injection torus and the mobile aerator with inclined blades is close to 2.5% of the diameter of the mobile aerator.

9. The equipment of claim 1, wherein the injection device is a torus, the torus having a diameter between 20 to 200% of the diameter of the propeller.

10. The equipment of claim 1, wherein the injection device is a torus, the torus having a diameter between 30 to 120% of the diameter of the propeller.

11. The equipment of claim 1, wherein said equipment floats thanks to the presence of one or more floats (3) and in that the distance between the lower face of the float and the upper leading edge of the propeller is between 0.5 to 1.5 times the diameter of the propeller.

12. The equipment of claim 1, wherein said equipment floats thanks to the presence of one or more floats (3) and in that the distance between the lower face of the float and the upper leading edge of the propeller is between 0.8 to 1.0 times the diameter of the propeller.

13. The equipment of claim 1, wherein the mobile aerator with inclined blades includes an even number of times the number of blades of the propeller situated at the end of the shaft.

14. The equipment of claim 1, wherein the mobile aerator with inclined blades includes 2 to 12 blades.

15. The equipment of claim 1, wherein the mobile aerator with inclined blades includes 4 to 8 blades.

16. The equipment of claim 1, wherein the mobile aerator with inclined blades is positioned below the injection device at a distance of between 5 mm to 100 mm from that injection device.

* * * * *